United States Patent
Kempf et al.

(12) 
(10) Patent No.: US 6,374,308 B1
(45) Date of Patent: Apr. 16, 2002

(54) METHOD AND APPARATUS FOR INTERACTIVELY CONNECTING DISTRIBUTED OBJECTS TO A GRAPHIC USER INTERFACE

(75) Inventors: James Kempf, Mountain View, CA (US); Malini Minasandram, Los Angeles, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/636,323

(22) Filed: Apr. 23, 1996

(51) Int. Cl.[7] .................................. G06F 9/54
(52) U.S. Cl. ..................... 709/316; 717/1; 345/762
(58) Field of Search .................. 395/680, 683, 395/682; 709/310–332; 345/762–770, 835; 717/1; 716/4; 707/103

(56) References Cited

U.S. PATENT DOCUMENTS

| | | | |
|---|---|---|---|
| 5,530,864 A | * 6/1996 | Matheny et al. | ............ 709/315 |
| 5,559,948 A | * 9/1996 | Bloomfield et al. | ........ 345/835 |
| 5,692,183 A | * 11/1997 | Hapner et al. | .............. 707/103 |
| 5,848,419 A | * 12/1998 | Hapner et al. | .............. 707/103 |
| 5,872,973 A | * 1/1999 | Mitchell et al. | ............ 709/332 |
| 5,877,966 A | * 3/1999 | Morris et al. | ................... 716/4 |

OTHER PUBLICATIONS

Wagner, Richard, "Delphi 2.0," Delphi Informant, pp(7), Feb. 1996.*
(no author given) "IDL Objective–C Language Mapping Specification," NeXT Computer, pp(11), 1993.*
Lozinkski, Christopher, "Why I need Objective–C," JOOP, pp. 21–26, Sep. 1991.*
OMG, Common Object Request Broker: Architecture and Specification, Revision 2.0, Jul. 1995, pp. 7–1–7–11, 8–1–8–10, and 11–1–11–7.*
IBM, SOM Objects Developer Toolkit, Programmer's Guide, vol. II: Object Services, SOM Objects Version 3.0, Dec. 1996, pp. 4–26.*
SOM Objects Developer Toolkit User Guide, Version 2.0, IBM, 6–1–6–20 and 6–50–6–55, Jun. 1993.*

* cited by examiner

*Primary Examiner*—St. John Courtenay, III
(74) *Attorney, Agent, or Firm*—J. D. Harriman, II; Coudert Brothers LLP (57) ABSTRACT

A connection is dynamically created between a graphic user interface (GUI) and a statically typed, distributed object using the present invention. The connection is created without requiring a developer to write customized code. The surrogate object acts as an intermediary between the GUI and the distributed object. The surrogate object is created using declarative information specified at build time and information generated at run time. The GUI and statically typed, distributed objects are connected via the surrogate object

20 Claims, 6 Drawing Sheets

METHOD AND APPARATUS FOR INTERACTIVELY CONNECTING DISTRIBUTED OBJECTS TO A GRAPHIC USER INTERFACE

BACKGROUND OF THE INVENTION

1. Field of the Invention

This invention relates to object-oriented programming and, more specifically, to the interactive connection of distributed objects to a graphic user interface (GUI).

2. Background

A software application typically includes a GUI that provides an interface between an application user and the application. In an object-oriented environment, the GUI uses GUI objects to control the fields in the GUI. To use the data input via the GUI, an application object is connected to the GUI object Data entered in a GUI field is forwarded to the application object via the connection formed between the GUI object and the application object. In a distributed environment, the GUI object and application object can reside on different computer systems.

In the prior art, it is necessary to generate customized code for use by the software application to create the connection between the GUI object and the application object. This is a disadvantage because it makes the code more complicated and increases the cost in time associated with development of an application. The following provides a background of prior art development environments and the need to generate such custom code.

Development Environment

A GUI is typically created using a development environment. An example of a technology that provides a development environment is OpenStep. OpenStep™ is an open, high-volume portable standard for object-oriented computing. It provides a standard application programming interface (API). The OpenStep specification is based on NeXT-Step. NeXTStep™ is an object-oriented operating system of NeXT Software, Inc.

The NeXTStep environment runs in the Mach operating system (OS). The Mach OS is a microkernel-based operating systems. A microkernel-based OS provides a basic level of services with the bulk of the operating system services supplied by user-level services. For example, the Mach kernel provides process management, memory management, communication and Input/Output services. Services such as files and directories are handled by user-level processes.

Solaris™ is a UNIX operating environment that can run on multiple hardware platforms such as Intel x86, SPARC, and PowerPC processors. OpenWindows™ is a windowing system based on the X11 windowing specification that runs in Solaris. The X11/DPS is a windowing system that runs in OpenWindows. Solaris, OpenWindows, and X11/DPS are products that are available from Sun Microsystems, Inc. (Sun Microsystems, Inc., OpenWindows, X11/DPS, and Solaris are trademarks or registered trademarks of Sun Microsystems, Inc. in the U.S. and certain other countries.) An implementation of OpenStep runs in the Solaris operating environment.

Development Tools

A development environment such as that provided by OpenStep includes tools that can be used to develop a software application. Examples of such tools are: Interface-Builder (IB) and ProjectBuilder (PB).

The PB is a tool that can be used to logically group, connect, and manage the files and components of an application. A project file contains all of the information about the end product (e.g., a software application). A project can be a stand-alone application, a subproject that is contained within another project, a bundle that contains resources that can be used by other applications, for example.

The IB is a tool that can be used to build a GUI for an application. It assists in the design and definition of the presentation layer of an application. The IB provides a GUI that allows a developer to drag objects such as text fields, radio buttons, and custom views to the application window. The IB saves an application's objects in a file referred to as a pickled object file (e.g., a nib file).

The IB also allows the developer to make connections between the application's interface and other application objects. A connection can be used to send a message between an interface object and another object, for example. A connection is typically made by defining an outlet. An outlet is an instance variable in an Objective-C class that can store a pointer to another object (e.g., type "id"). The value of the instance variable is typically set to the "id" of an object in the nib file such as a GUI object. When an outlet is set to the "id" of an object, this is known as a connection.

Object Interface

An interface defines how an object can communicate, or interact, with another object. An interface defines an object's type, attributes, the methods it exports, and the method parameters. An object that understands another object's interface can generate a request for the other object to perform an operation.

Binding refers to the linking of the software interface to the code that implements the interface. Dynamic binding only requires that the interface be determined at the time a message is sent between the objects. In contrast, if the binding is static, the interface for the client and server is determined at compile or build time.

Typing refers to the identification of an object's type, or class. Static typing requires that an object's type be known at compile time. In contrast, it is not necessary to know the type, or class, of an object at compile-time if dynamic typing is used. Instead, an object's type may be determined at run time.

Both C++ and Objective-C support dynamic, or run time, binding. However, C++ does not support dynamic typing. A C++ object's type must be declared at compile time. In contrast, an Objective-C object's type does not need to be available at compile time. Objective-C object typing can be dynamic (i.e., determined at run time).

Distributed Environment

Software applications can take advantage of a distributed computing capability referred to as distributed objects. Using distributed objects, a first object (a client object) can send a message to a second object (a server object) regardless of the physical location of either object. That is, the client and server objects can reside on different machines.

The distributed object technology uses a name server and a local proxy to allow a client object to communicate with a server object. A name server is used to register the server object. A client accesses the name server to look up the name of the server object. Using the name information, the client object directs a message to the server object.

Instead of going directly from the client to the server, the message is actually received by a proxy object that resides on the same machine as the client object. The proxy object forwards the message to the server object on the server object's machine. A response generated by the server object is forwarded to the client object via the proxy object. The client object need not know the location of the server object. As far as the client object is concerned, the proxy object is the server object. However, the proxy object is only a vehicle for forwarding the message to the server object via the network. The details of the network communication is therefore hidden from the client object.

NEO provides a development environment and run time system for developing and deploying distributed objects on a CORBA infrastructure having an OpenStep GUI. The NEO product is intended for developing and delivering distributed object applications based on a CORBA-compliant infrastructure.

A CORBA object has an associated definition that is used to specify the object's interface. The definition is parsed at run time and stored in a repository. A server provides access to the repository at run time to determine a CORBA object's interface.

A CORBA object such as an object created using the NEO framework, a NEO object, is therefore dependent on a connection with the server. The connection to the server is not made while a developer is using the IB, but rather when a nib file is actually loaded at run time.

The applications developed using the NEO product use an OpenStep object-oriented GUI tool kit. The GUI tool kit contains Objective-C object classes. The IB provides the ability to connect an instance of a GUI tool kit Objective-C object class to another Objective-C object instance. For example, a GUI text field object that allows text entry such as an employee name is connected to an employee name Objective-C object that performs operations on the employee name.

Custom Code Generation

A developer typically uses an IB to create an object and establish a connection between the GUI object (e.g., text field object) and an application object (e.g., employee name Objective-C object). For example, a connection is formed by specifying an outlet of one object to point to another object. If the application object is an Objective-C object, it is not necessary to specify the outlet's type statically (i.e., at build time). The type can be determined dynamically at run time. If, however, the application object is a C++ object, the outlet must have a static type that matches the run time type of the C++ application object. To match, the static type of the C++ application object can be the same type as, or a subclass of, the outlet's type.

If the application object is a CORBA object, it is necessary to generate customized code that obtains the CORBA object from a name server and to form the connection between the GUI object and the CORBA object. The code generation is either performed by the application software developer or a development tool such as an IB. Customized code generation must be performed for each application which requires additional development time and expense. In addition, the use of customized code adds to the complexity of the application's code.

SUMMARY OF THE INVENTION

A connection is dynamically created between a graphic user interface (GUI) and a statically typed, distributed object using the present invention. The connection is created without requiring a developer to write customized code or using a program development tool to generate customized code. Using the present invention, the connection is established dynamically at run time using declarative information specified at build time.

A template object is generated at build time that contains type and name information for a surrogate object. The surrogate object acts as a proxy for a distributed object (e.g., CORBA distributed object). At run time, the template object is used to identify the surrogate object. The surrogate object is connected to the GUI object at run time. The surrogate can be a statically-typed object. Thus, the present invention can be used to form a dynamic connection between a GUI object and a statically-typed object The GUI object is connected to the distributed object via the surrogate object.

The name information stored in the template object at build time is used to query a name server for an untyped surrogate object of a distributed object. The untyped surrogate object is transformed into a typed surrogate object at run time using the type information of the template object. A connection is formed between the typed surrogate object and the GUI object.

DETAILED DESCRIPTION OF THE INVENTION

A method and apparatus for interactively connecting distributed objects to a graphic user interface is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
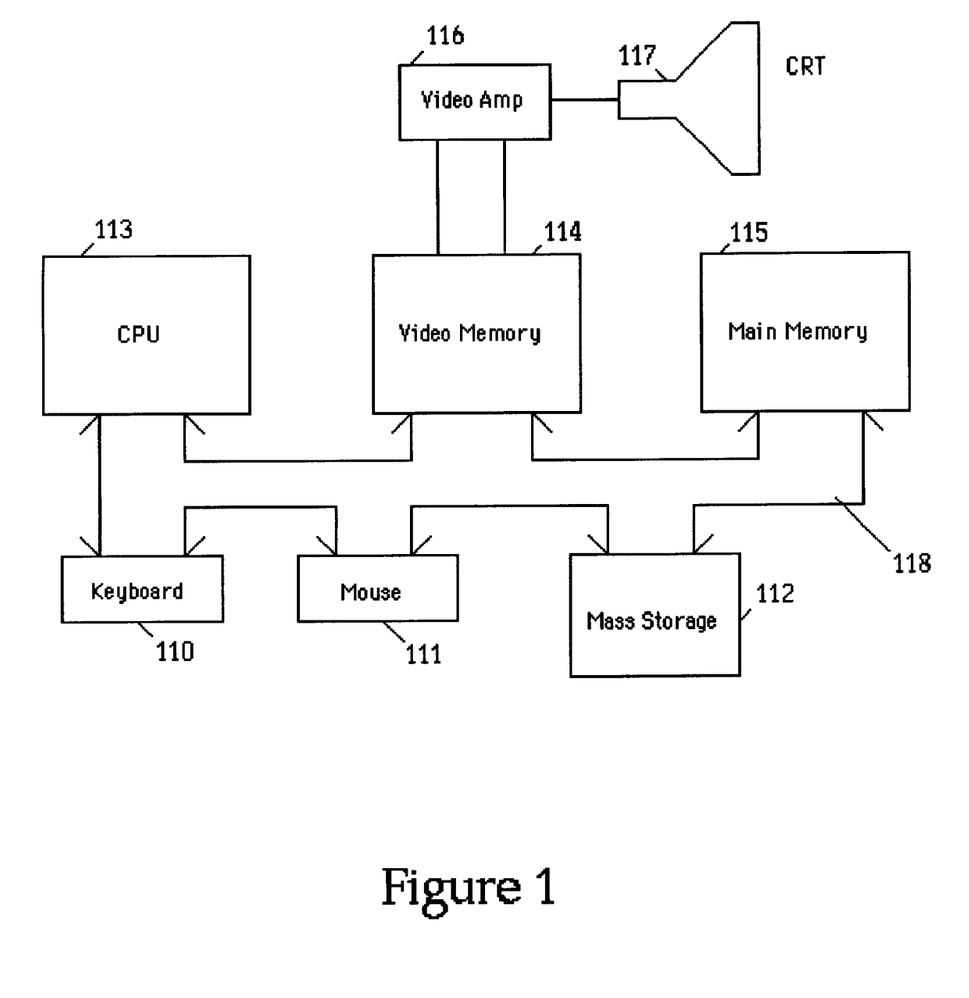
FIG. 1 provides an example of a general purpose computer to be used in accordance with embodiments of the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bidirectional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, and a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680X0 processor, a 80X86 microprocessor manufactured by Intel, or a SPARC microprocessor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment. When a general purpose computer system such as the one described executes the processes and process flows described herein, it is configured to interactively connect distributed objects to a GUI.

Figure 2:
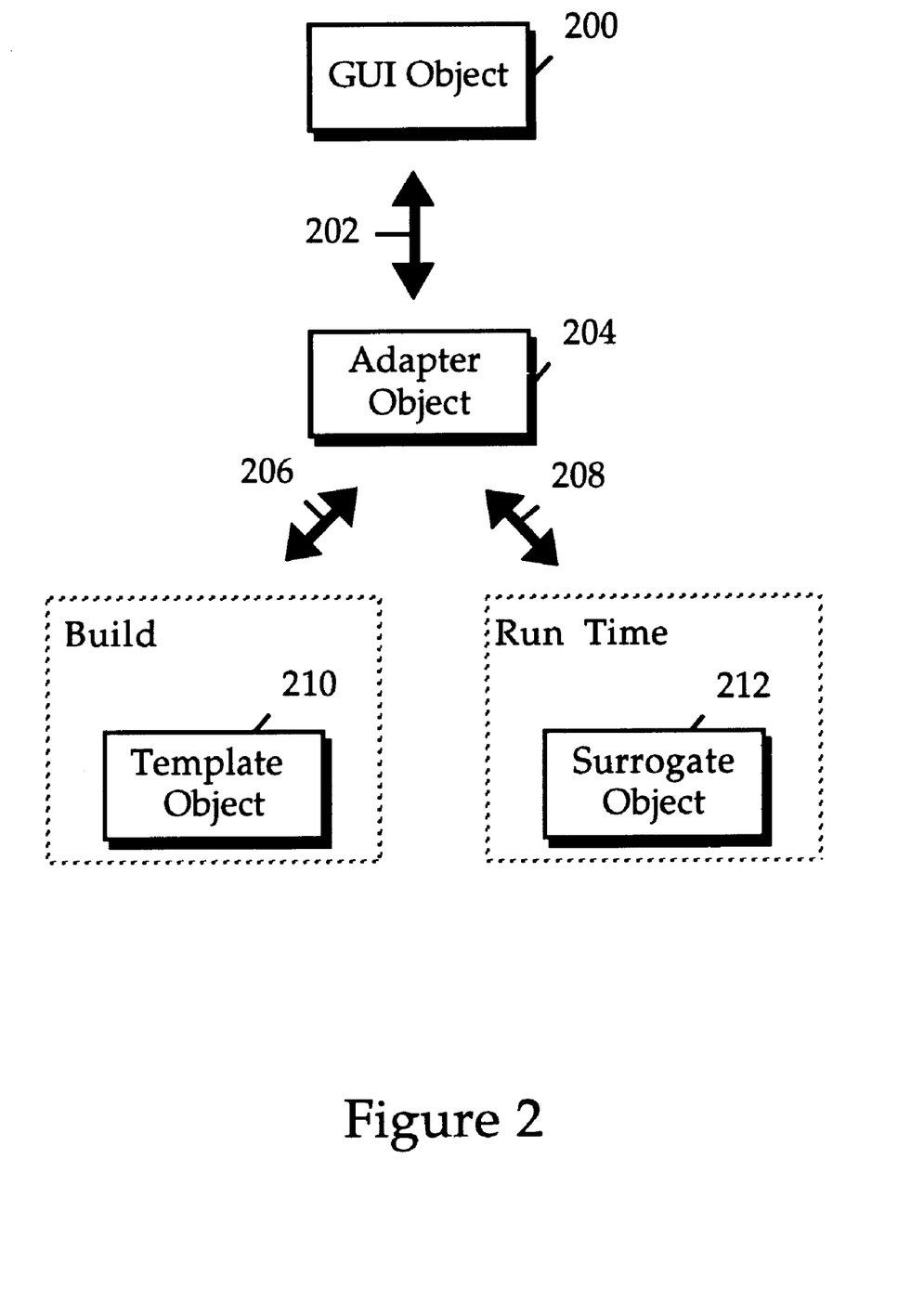
FIG. 2 illustrates the creation of a dynamic connection to a static object according to an embodiment of the present invention.

The present invention can dynamically create the connection between an Objective-C object and a C++ statically-typed object, for example. FIG. 2 illustrates the creation of a dynamic connection to a static object according to an embodiment of the present invention. The Objective-C object is GUI object 200. GUI object 200 is a dynamically typed object. In the preferred embodiment, adapter object 204 is used as an intermediate object between an Objective-C object and another object such as a C++ object. Adapter object 204 performs functions such as data translation, for example. Adapter object 204 is preferably a dynamic object. However, it should be apparent that the present invention can be used without adapter object 204. As an alternative, GUI object 200 can perform the functions performed by adapter object 204, for example.

At development (or build) time, connection 206 is established between adapter object 204 and template object 210. Connection 206 is specified using an IB, for example. Connection 208 is established at run time. Connection 208 connects adapter object 204 to surrogate object 212. Surrogate object 212 is a statically typed C++ object. Surrogate object 212 can be used as a local proxy for a distributed object such as a CORBA object, for example.

Information is stored in the nib file created by the IB at development time that is used to dynamically create surrogate object 212 and dynamically establish connection 208. The nib file contains a definition for template object 210. The definition includes: 1) a service name for surrogate object 212, and 2) the type of the surrogate object 212.

When the nib file is loaded at run time, the definition of template object 210 is encountered. Template object 210 is used to determine a CORBA reference for the distributed object associated with surrogate object 212. The type information is used to identify a type narrowing function referred to as a narrowing function, for surrogate object 212. The narrowing function transforms the surrogate object 212 into an object that is a sub-type, or subclass, of a CORBA supertype. Connection 208 is established between adapter object 204 and surrogate object 212. Connection 208 is formed by setting an outlet instance variable of adapter object 204 to point to surrogate object 212, for example.

GUI object 200 and surrogate object 212 are connected via adapter object 204 and connection 208. GUI object 200 is connected to adapter object 204 via connection 202. Connection 202 is formed by assigning a value to an outlet of GUI object 200, for example. GUI object 200 can send a message to adapter object 204 via connection 202. Connection 208 is used to forward the message generated by GUI object 200 to surrogate object 212. If surrogate object 212 is acting as a proxy for another object (i.e., a CORBA object), surrogate object 212 can forward the message to the other object Using the present invention, it is unnecessary for a developer to generate customized code to create surrogate object 212 and connection 208 at run time. That is, it is unnecessary for a developer or an IB to generate code to determine the CORBA reference for surrogate object 212, initiate the creation of surrogate object 212, and establish connection 208 between adapter object 204 and surrogate object 212. Thus, the present invention can be used to automatically create a connection between a dynamically-typed GUI object and a statically-typed, C++ object at run time. Further, the present invention can be used to automatically create an interactive connection between a GUI object and a CORBA object, if the statically-typed, C++ object is a surrogate, or proxy, for the CORBA object.

Figure 3:
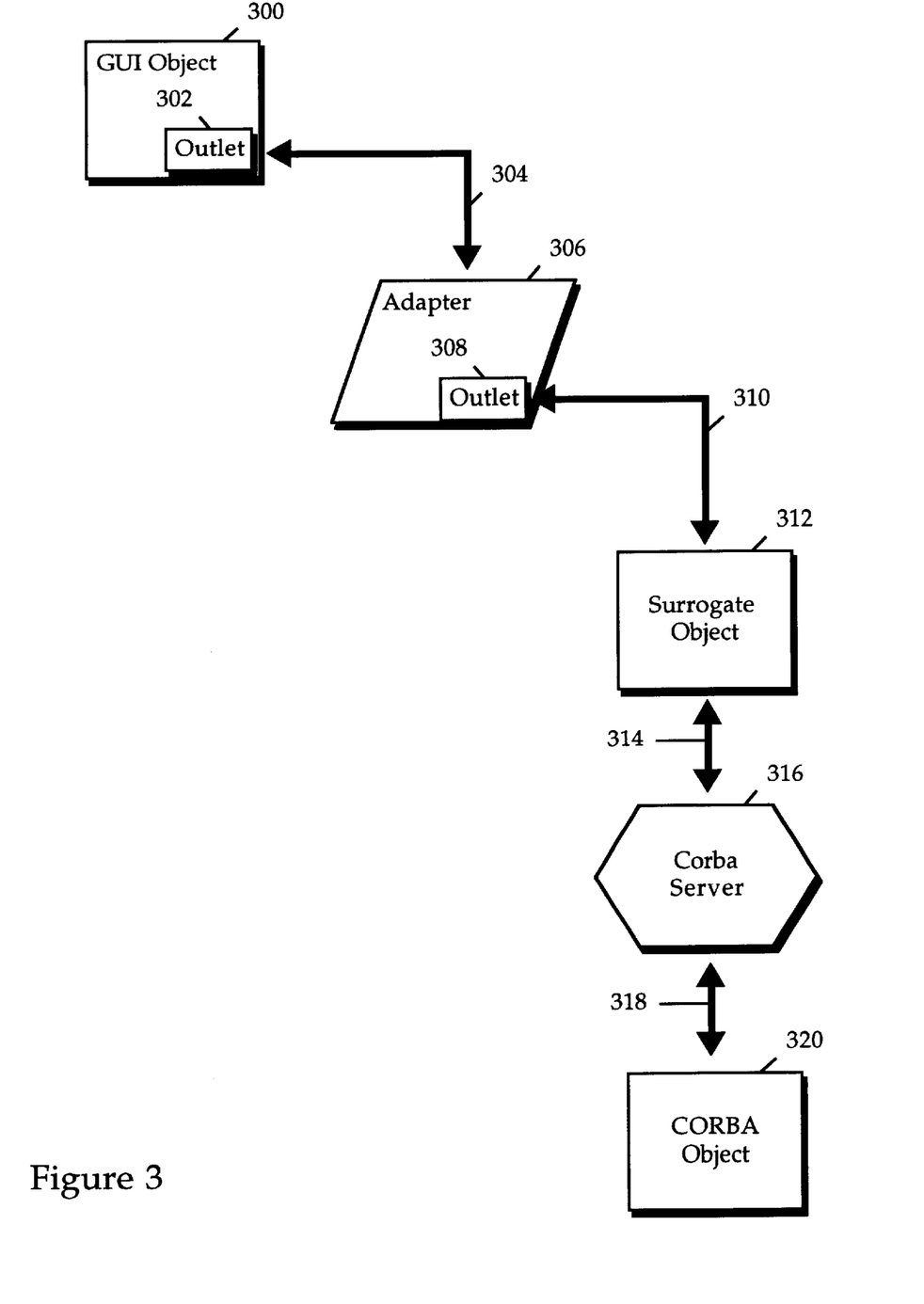
FIG. 3 provides a diagram of a connection between a GUI object and a CORBA distributed object.

FIG. 3 provides a diagram of a connection between a GUI object and a CORBA distributed object. GUI object 300 is connected to adapter object 306 via connection 304. Connection 304 can be formed by setting outlet instance variable 302 of GUI object 300 to point to adapter object 306, for example. GUI object 300 and adapter object 306 can be Objective-C, dynamically-type objects. Connection 304 is preferably set using the IB. GUI object 300 can be connected to CORBA object 320 at run time.

In the preferred embodiment, the connection between GUI object 300 and CORBA object 320 is established via adapter object 306, surrogate object 312 and CORBA server 316 at run time. At run time, surrogate object 312 is created and connection 310 is established between adapter object 306 and surrogate object 312.

Surrogate object 312 is created at run time based on a definition in an application's nib file of template object 210, for example. Preferably, a development tool such as the IB is used to define template object 210 at build time. In one example, a Make Template Object menu command of the IB can be selected. The Make Template Object command is used to indicate that an instance of template object 210 is to be included in the application's nib file definition. A result of a Make Template Object selection is the inclusion of a definition for template object 210 in the application's nib file. The GUI of the IB can be used to establish a connection between GUI object 200 and surrogate object 212. This connection is specified by graphically connecting icons that represent adapter object 204 and template object 210. The IB is also used to specify the service name for, and type (or class) of, surrogate object 212.

The information specified using the IB is stored in a nib file of the application being developed. Specifically, the nib file contains a declaration for template object 210 along with declarations for adapter object 204 and GUI object 200. The declaration for template object 210 includes declarations for the name and type values of surrogate object 212.

Figure 4A:
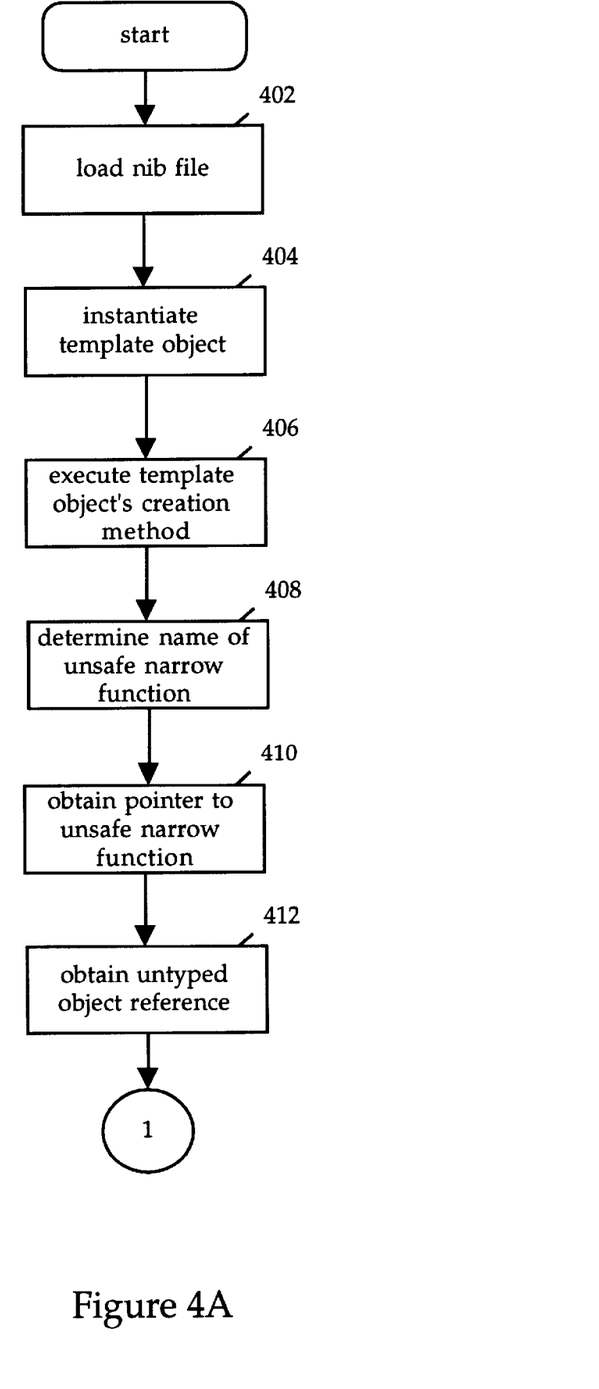
FIGS. 4A–4B provides a process flow for template and surrogate object creation according to an embodiment of the present invention.
Figure 4B:
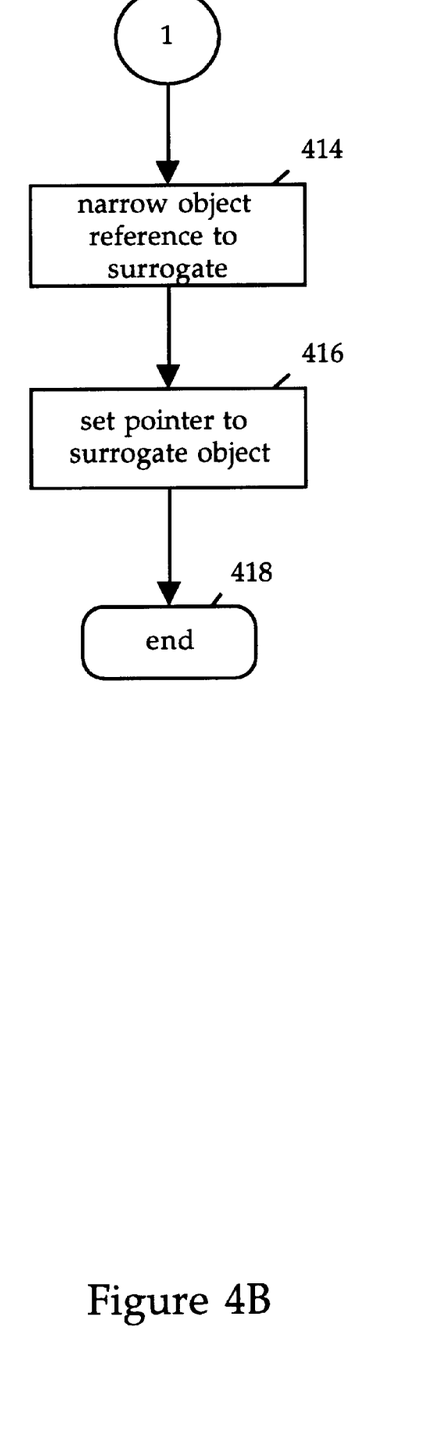

When the software application is invoked or run, the application is loaded into memory for execution. The application's run time environment is initialized. The application's nib file is examined and entries in the nib file are used to create instances of objects. When the declaration for template object 210 is encountered, an instance of the object class for template object 210 is created. A creation method of the template object class is used to create template object 210. In the preferred embodiment, the creation method is also used to initiate the creation of surrogate object 212. FIGS. 4A–4B provides a process flow for template and surrogate object creation according to an embodiment of the present invention.

At step 402, the nib file is loaded. At step 404, an instance of the template object class is created. At step 406, the template object's creation method is invoked. At step 408, the type value contained in the nib file is used to generate the name of an narrowing function. The narrowing function is used to narrow a supertype obtained from the CORBA server to the surrogate object's type. At step 410, a symbol lookup is performed in a dynamic link library for the surrogate's stub code to obtain a pointer to the narrowing function. At step 412, the name server is queried to obtain an untyped CORBA object reference using the service name information (e.g., a string) stored in the template object.

The untyped CORBA object reference can be a reference to an untyped surrogate object The untyped surrogate object is created when the look up operation is performed at step 412. The untyped object reference actually has the root type of the object class hierarchy. The root class is referred to as the base supertype. At step 414, the narrowing function and untyped, or supertyped, object reference are used to narrow the object reference to the surrogate object. That is, for example, the supertype is narrowed to the type specified in the type information of the template declaration using the narrowing function. At step 416, an outlet of the adapter object (e.g., adapter object 306) is set to point to the surrogate object (e.g., surrogate object 312).

An error may occur during the processing of the nib file template object entry. At step 412, for example, an object reference may not be found in the name server. Such a failure can be reported using an alert panel or by printing a message. If no errors occur, outlet 308 of adapter object 306 is pointing to a valid surrogate object (e.g., surrogate object 312) after the initialization process is finished. If an error occurred, outlet 308 is preferably a null pointer. The application can determine whether to proceed or terminate.

Figure 5:
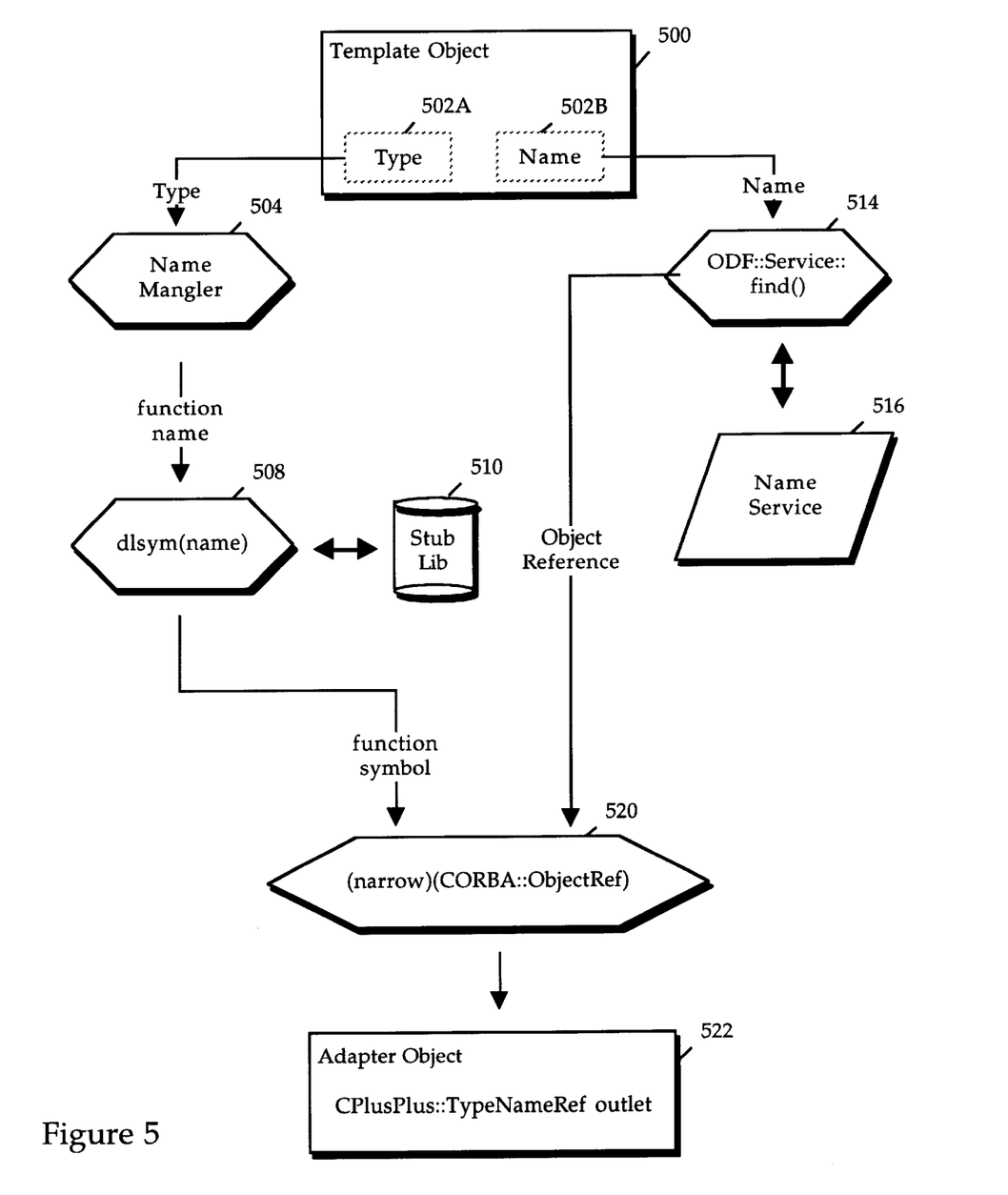
FIG. 5 provides an example of the process flow illustrated in FIGS. 4A–4B.

FIG. 5 provides an example of the flow illustrated in FIGS. 4A–4B. Template object 500 includes a type information 502A and a name information 502B. Type information 502A becomes the input for name mangling routine 504. Name mangling routine 504 is, for example, the name mangling routine provided in a C++ ABL Name mangling routine 504 constructs a narrowing function name from type information 502A. The narrowing function name is used as input to dynamic link library symbol lookup, or dlsym, function 508. Dlsym function 508 performs a symbol lookup in stub library 510 to obtain a pointer, or function symbol, to the narrowing function having the narrowing function name.

Name information 502B is used by the run time library to invoke a find operation 514 (i.e., ODF::Service::find()) on name server 516. Name server 516 obtains an untyped CORBA object reference to the surrogate object (i.e., CORBA::ObjectRef) associated with the service specified by the name information 502B. Narrowing function 520 is invoked using the function symbol, or pointer, obtained using dlsym function 508. The surrogate object containing the untyped CORBA object obtained from name server 516 is an argument of narrowing function 520. Narrowing function 520 transforms the surrogate object to a C++ subtype. An outlet of source object 522 (e.g., adapter object 306) is set to point to the surrogate object (e.g., surrogate object 312).

The present invention's functionality can be reused across applications. Software application developers can incorporate the invention's functionality in multiple applications without generating a separate instance of code for each application.

Thus, a method and apparatus for the interactively connecting distributed objects to a graphic user interface has been described in conjunction with one or more specific embodiments. The invention is defined by the claims and their full scope of equivalents.

What is claimed is:

1. A method of dynamically connecting a graphic user interface (GUI) object to a statically-typed, distributed object comprising the steps of:

generating a template object at build time;

identifying a surrogate object of said distributed object at run time using said template object;

executing said template object's creation method to automatically create said surrogate object; and connecting said surrogate object to said GUI object at run time.

2. The method of claim 1 wherein said template object includes a name and type specification.

3. The method of claim 1 wherein connecting a GUI object to said surrogate object further comprises:

connecting said GUI object to an adapter object; and connecting said adapter object to said surrogate object.

4. The method of claim 3 wherein said adapter object and said GUI object are dynamically-typed objects.

5. The method of claim 3 wherein said surrogate object is a statically-typed object.

6. The method of claim 1 wherein said step of identifying further comprises the steps of:

obtaining an untyped surrogate object; and transforming said untyped surrogate object into a typed surrogate object.

7. The method of claim 6 wherein said step of obtaining further comprises the steps of:

storing a service name for said distributed object in said template object at build time; and querying a name server for an object reference for said untyped surrogate object associated with said service name at run time.

8. The method of claim 6 wherein transforming further comprises:

storing type information for said surrogate object in said template object at build time;

identifying a narrowing function using said type information at run time; and transforming said untyped surrogate object into said typed surrogate object using said narrowing function.

9. An article of manufacture comprising:

a computer usable medium having computer readable program code embodied therein for dynamically connecting a graphic user interface (GUI) object to a statically-typed, distributed object, the computer readable program code in said article of manufacturing comprising:

computer readable program code configured to cause a computer to generate a template object at build time;

computer readable program code configured to cause a computer to identify a surrogate object of said distributed object at run time using said template object;

computer readable program code configured to cause a computer to execute said template object's creation method to create said surrogate object; and computer readable program code configured to cause a computer to connect said surrogate object to said GUI object at run time.

10. The article of manufacture of claim 9 wherein said template object includes a name and type specification.

11. The article of manufacture of claim 9 wherein the program code configured to cause a computer to connect said surrogate object to said GUI object further comprises:

computer readable program code configured to cause a computer to connect said GUI object to an adapter object; and     computer readable program code configured to cause a computer to connect said adapter object to said surrogate object.

12. The article of manufacture of claim 11 wherein said GUI object and said adapter object are dynamically-typed objects.

13. The article of manufacture of claim 11 wherein said surrogate object is a statically-typed object.

14. The article of manufacture of claim 9 wherein said program code configured to identify further comprises:

computer readable program code configured to cause a computer to obtain an untyped surrogate object; and     computer readable program code configured to cause a computer to transform said untyped surrogate object into a typed surrogate object.

15. The article of manufacture of claim 14 wherein said program code configured to obtain further comprises:

computer readable program code configured to cause a computer to store a service name for said distributed object in said template object at build time; and     computer readable program code configured to cause a computer to query a name server for an object reference for said untyped surrogate object associated with said service name at run time.

16. The article of manufacture of claim 14 wherein said program code configured to transform said untyped surrogate object further comprises:

computer readable program code configured to cause a computer to store type information for said surrogate object in said template object at build time;

computer readable program code configured to cause a computer to identify a narrowing function using said type information at run time; and     computer readable program code configured to cause a computer to transform said untyped surrogate object into said typed surrogate object using said narrowing function.

17. A method of dynamically connecting a graphic user interface (GUI) object to a statically-typed, distributed object comprising the steps of:

generating a template object having a creation method at build time, wherein said template object comprises a service name and type specification;

identifying an untyped surrogate object of said statically-typed distributed object at run time using said template object, said identifying step further comprising:

storing said service name and said type specification for said statically-typed distributed object in said template object at build time;

querying a name server for an object reference for said untyped surrogate object associated with said service name at run time;

obtaining said untyped surrogate object at run time;

identifying a narrowing function using said type information at run time;

transforming said untyped surrogate object into a typed surrogate object at run time by automatically applying said narrowing function to said untyped surrogate object;

executing said template object's creation method to create said surrogate object; and         connecting said surrogate object to said GUI object at run time.

18. The method of claim 17 wherein, said connecting step further comprising:

connecting said GUI object to an adapter object; and connecting said adapter object to said surrogate object.

19. The method of claim 18 wherein said adapter object and said GUI object are dynamically-typed objects.

20. The method of claim 17 wherein said surrogate object is a statically-typed object.

\* \* \* \* \*